Sept. 22, 1970   P. P. JOHNSON ET AL   3,529,744

CLOSURE HAVING AN INTEGRAL PLASTIC HANDLE

Filed Aug. 30, 1968

INVENTORS.
PHILIP P. JOHNSON
WILLIAM J. EDWARDS

BY *Aofgen, Wegner, Allen, Stillman & McCord*

ATTORNEYS.

3,529,744
CLOSURE HAVING AN INTEGRAL
PLASTIC HANDLE
Philip P. Johnson, St. Joseph, and William J. Edwards,
  Benton Harbor, Mich., assignors to Whirlpool Corporation, a corporation of Delaware
Filed Aug. 30, 1968, Ser. No. 756,672
Int. Cl. B65d 25/28, 23/10
U.S. Cl. 220—94                                      5 Claims

ABSTRACT OF THE DISCLOSURE

A handle comprising a base with a hand engageable part projecting outwardly from the base and undercut sides on this projecting part in which each side has a width greater than the corresponding distance between the top of the hand engageable part and the base and distortable inwardly under pressure from an outwardly projecting position between the top portion and base, past dead center to an undercut position so that when the handle is grasped by a hand the fingers and thumb can enter the open undercut portions beneath the top portion of the handle.

---

One of the features of this invention is to provide a handle that is easily fabricated with the sides of a hand engageable portion projecting outwardly for ease of fabrication but with these sides being distortable to force them to undercut positions for secure engagement of the hand with the sides of the handle.

Other features and advantages of the invention will be apparent from the following description of one embodiment thereof taken in conjunction with the accompanying drawings. Of the drawings.

Figure 1:
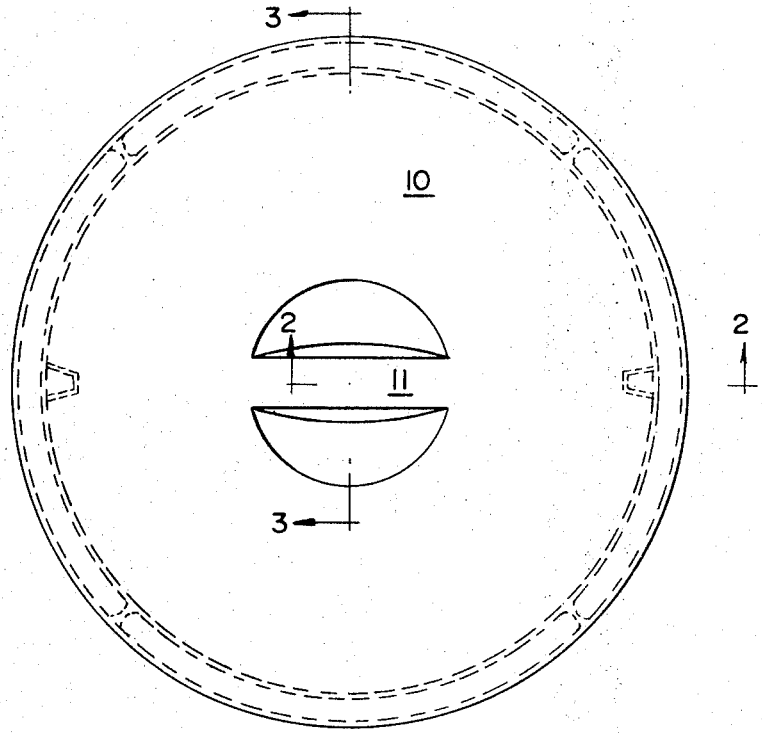
FIG. 1 is a plan view of a cover for a laundry tub including a handle embodying the invention.
Figure 2:
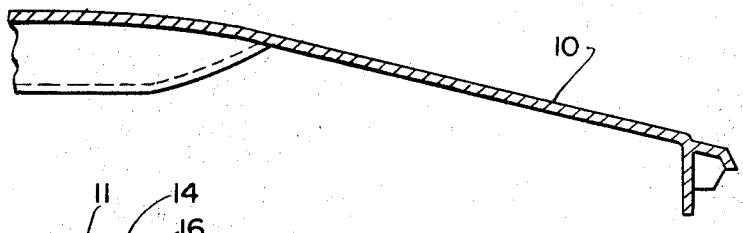
FIG. 2 is a fragmentary enlarged sectional view taken substantially along line 2—2 of FIG. 1.
Figure 3:
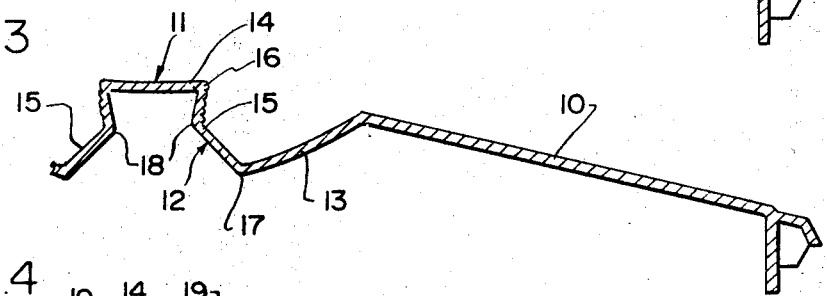
FIG. 3 is a fragmentary enlarged sectional view taken along line 3—3 of FIG. 1.

The handle is illustrated in the drawings as a part of a synthetic plastic cover 10 for a laundry tub and the like. This cover is provided at about its center with a handle 11 embodying the invention. This handle 11 as illustrated most clearly in FIG. 3 comprises a hand engageable part 12 projecting outwardly from a base 13 which in this embodiment is the portion of the cover 10 surrounding the handle 11.

The hand engageable part 12 includes a top portion 14 and undercut sides 15 that permit the thumb and fingers of a hand to grasp the handle securely when manipulating the cover 10.

Each of the sides 15 has a width from top to bottom as shown in the illustrated embodiment that is greater than the corresponding distance between the top portion 14 and the base 13 which as illustrated would be the distance between the corners 16 and 17.

Figure 4:
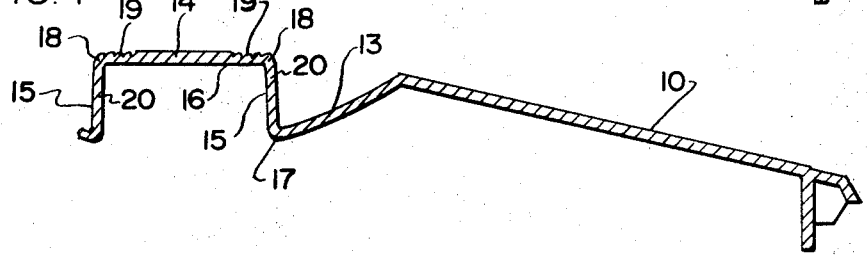
FIG. 4 is a view similar to FIG. 3 but illustrating the handle at an intermediate point in its manufacture.

Each of the sides 15 is distortable which of course is true of the synthetic plastics customarily used in manufacturing laundry tub covers 10. When first manufactured each side of the handle projects outwardly as illustrated in FIG. 4 between the points 16 and 17. Each side, however, is distortable inwardly under pressure applied to the exterior thereof from the outwardly projecting position as illustrated in FIG. 4 inwardly to the undercut position shown in FIG. 3. During this movement to the undercut position each side of course passes through dead center so that in effect it "snaps" to the position shown in FIG. 3. During this movement the base 13 on opposite sides of the handle is sprung first downwardly from the position shown in FIG. 4 and then back up to the position shown in FIG. 3 to permit the movement of the sides 15.

In a preferred construction each of the sides 15 is provided with a bendable zone 18 extending along the length of the handle intermediate the top portion 14 and the base 13. During the movement of the sides from the outwardly projecting position of FIG. 4 to the inwardly projecting undercut position of FIG. 3 the bending therefore takes place at the corners 16 and 17 and in the zone 18. When the sides are in their projecting positions as shown in FIG. 4 each side is arranged at an angle whose apex substantially coincides with the bendable zone 18. Similarly, when the sides have been moved to their undercut positions of FIG. 3 the zone 18 is still the apex but of course projecting in the opposite direction.

In the illustrated embodiment each side 15 in the area 19 between the top portion 14 and the corresponding bendable zone 18 is provided with a friction gripping surface here shown as a knurled surface.

In the illustrated embodiment the synthetic plastic cover 10 and the handle 11 are integral and can therefore be formed as a one-piece molding having the shape shown in FIG. 4. Then, when taken from the mold, in the embodiment illustrated, each side 15 at the area 19 is substantially coplanar with the top portion 14 of the handle. The two bendable zones 18 are also in this plane. Then, the remaining areas 20 of the sides 15 flare slightly away from each other as illustrated in FIG. 4 or in other words have a slight draft. This aids in removing the integral cover and handle from the mold. Then, in a subsequent operation the sides 15 are snapped to the undercut position shown in FIG. 3.

Having described our invention as related to the embodiment shown in the accompanying drawings, it is our intention that the invention be not limited by any of the details of description, unless otherwise specified.

The embodiment of the invention in which an exclusive property or privilege is claimed is defined as follows:

1. A handle comprising a synthetic plastic, said handle comprising: a base; a hand engageable part projecting outwardly from the base; a top portion on said part; and undercut sides on said part, each said side having a width greater than the corresponding distance between said top portion and said base and having a bendable zone comprising angular portions defining a crease, said bendable zone extending longitudinally of said handle intermediate said top portion and base, said side being distortable inwardly about said bendable zone under pressure from an outwardly projecting position between said top portion and base to a recessed position with said bendable zone extending inwardly.

2. The handle of claim 1 wherein each said side adjacent said top portion is provided with a friction gripping surface.

3. The handle of claim 1 wherein each said bendable zone extends along the length of its said side, each said side being arranged at an angle whose apex is said bendable zone when the side is in said projecting position as well as in said recessed position, said base adjacent said sides being bendable when said sides pass from said projecting position to said recessed position.

4. The handle of claim 3 wherein each said side between said top portion and said bendable zone is knurled to provide a friction gripping surface.

5. The handle of claim 1 wherein said base and hand engaging part are integral.

References Cited

UNITED STATES PATENTS

| | | | |
|---|---|---|---|
| D. 160,516 | 10/1950 | Marsh | 222—465 XR |
| 2,610,490 | 9/1952 | Tupper | 222—210 |
| 2,756,793 | 7/1956 | Tupper | 150—0.5 |
| 2,913,140 | 11/1959 | Vuillemenot. | |
| 2,950,032 | 8/1960 | Willis et al. | 220—94 XR |
| 3,080,993 | 3/1963 | Livingstone | 220—60 XR |
| 3,156,374 | 11/1964 | Scholtz | 220—29 |

RAPHAEL H. SCHWARTZ, Primary Examiner

U.S. Cl. X.R.

220—60